United States Patent
Chi et al.

(10) Patent No.: US 7,050,490 B2
(45) Date of Patent: May 23, 2006

(54) BLIND ADAPTIVE FILTERING METHOD FOR RECEIVERS OF COMMUNICATION SYSTEMS

(75) Inventors: Chong-Yung Chi, Hsinchu (TW); Chii-Horng Chen, Hsinchu (TW)

(73) Assignee: Accton Technology Corporation, Hsinchu (TW)

( * ) Notice: Subject to any disclaimer, the term of this patent is extended or adjusted under 35 U.S.C. 154(b) by 761 days.

(21) Appl. No.: 09/974,581

(22) Filed: Oct. 9, 2001

(65) Prior Publication Data

US 2003/0091134 A1 May 15, 2003

(51) Int. Cl.
 *H03H 7/30* (2006.01)

(52) U.S. Cl. .................................... 375/232

(58) Field of Classification Search ................. 375/229, 375/285, 316, 346, 350; 708/300, 319, 323
See application file for complete search history.

(56) References Cited

U.S. PATENT DOCUMENTS 6,049,574 A * 4/2000 Noonan et al. ............. 375/346

OTHER PUBLICATIONS

Chi et al., Blind Equalization Using Cumulant Based MIMO Inverse Filter Criteria for Multiuser DS/CDMA Systems in Multipath Proceedings of the 11th IEEE Signal Processing Workshop on Statistical Signal Processing, Aug. 6-8, 2001.*
Inouye et al., "Super-Exponential Algorithms for Multichannel Blind Deconvolution", IEEE Transactions on Signal Processing, vol. 48, No. 3, Mar. 2000.*

* cited by examiner

*Primary Examiner*—Kenneth Vanderpuye
*Assistant Examiner*—Kevin Kim
(74) *Attorney, Agent, or Firm*—J.C. Patents

(57) ABSTRACT

A blind adaptive filtering method for receivers of communication systems without need of training sequences, and whose performance is close to that of the non-blind linear minimum mean square error (LMMSE) receivers with training sequences required in practical environments of finite signal-to-noise (SNR) and data length. This algorithm is an iterative batch processing algorithm using cumulant based inverse filter criteria with super-exponential convergence rate and low computational load. The receivers to which the presented algorithm can be applied are (but not limited to) equalizers of conventional time division multiple access (TDMA) digital communication systems, and smart antennas based on space-time processing for wireless communication systems.

9 Claims, 3 Drawing Sheets

Signal processing of each iteration of Algorithm 1.

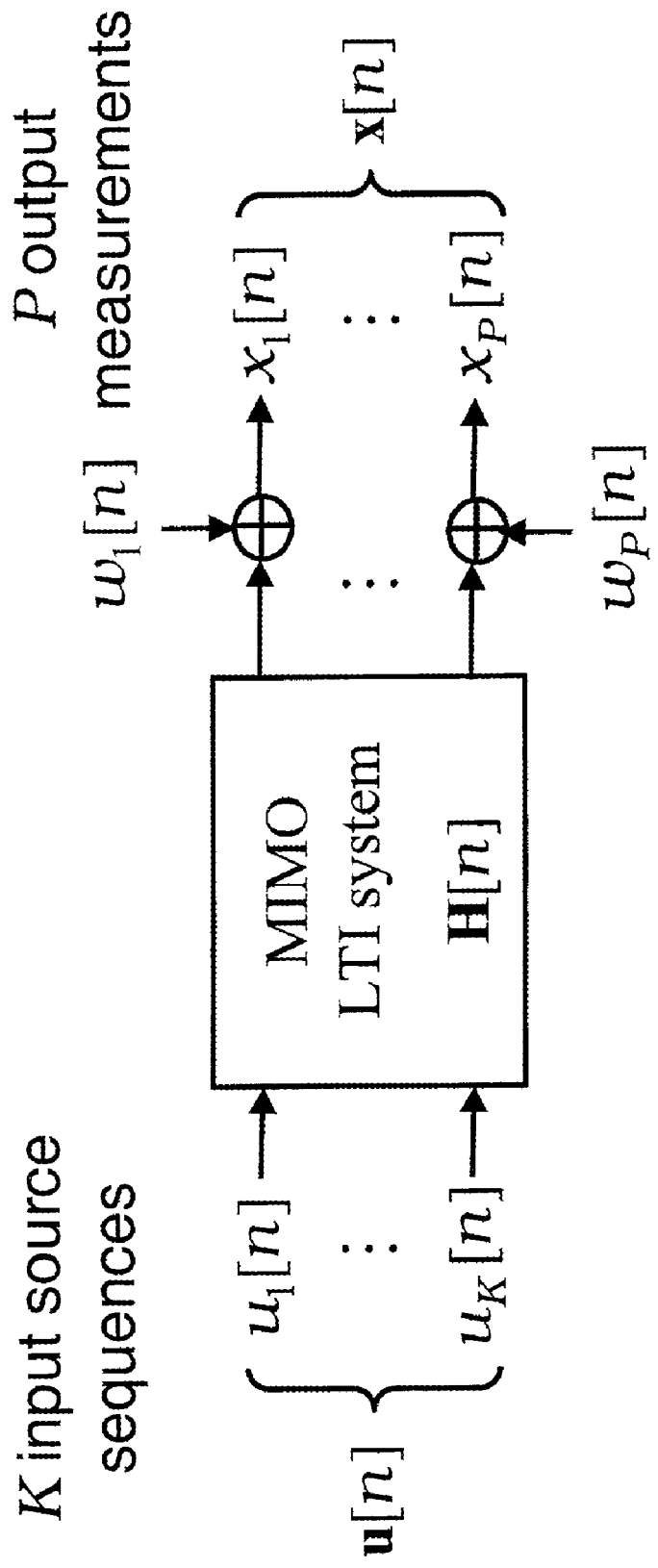
Figure 1. The MIMO LTI system.

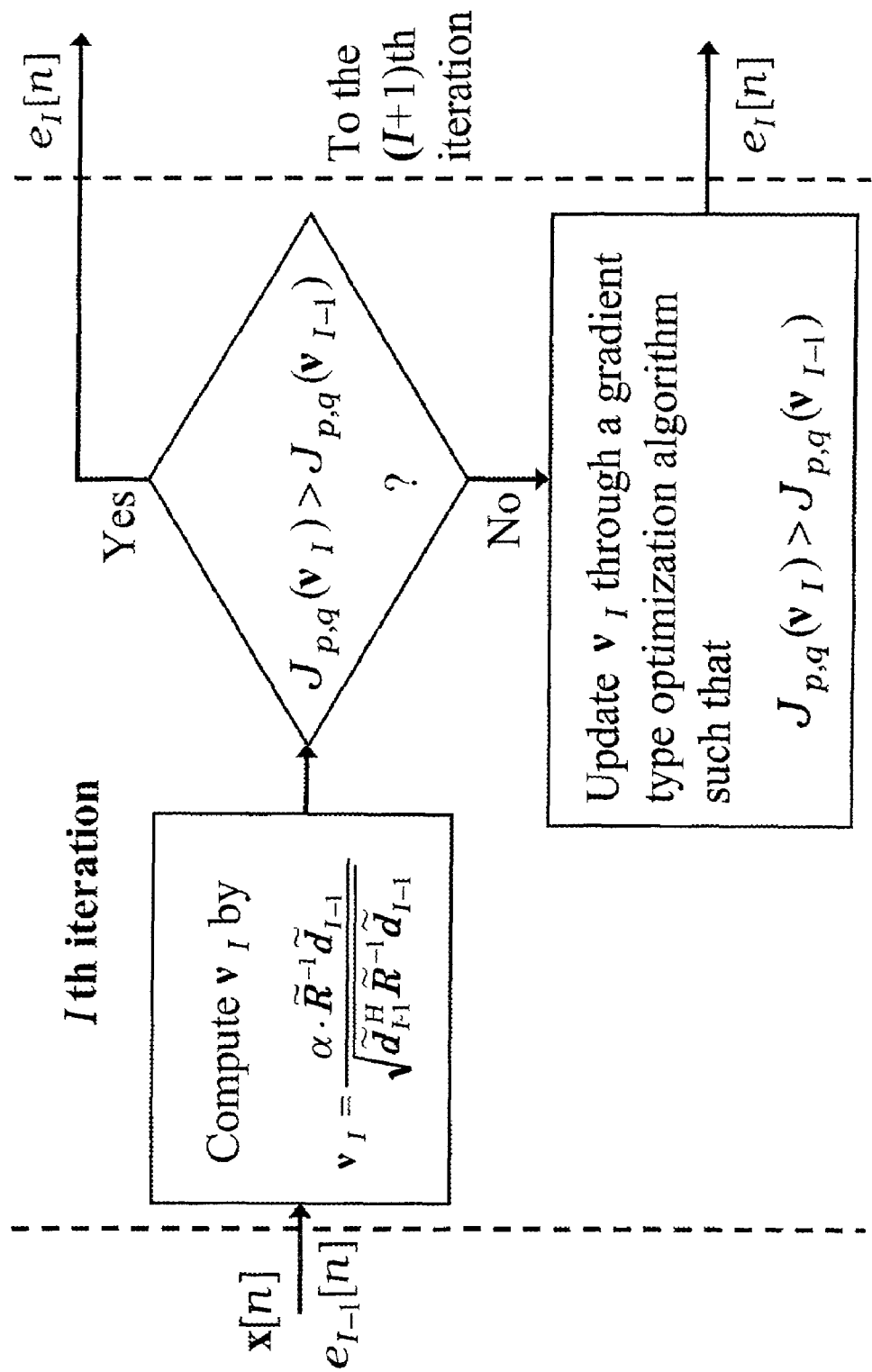
Figure 2. Signal processing of each iteration of Algorithm 1.

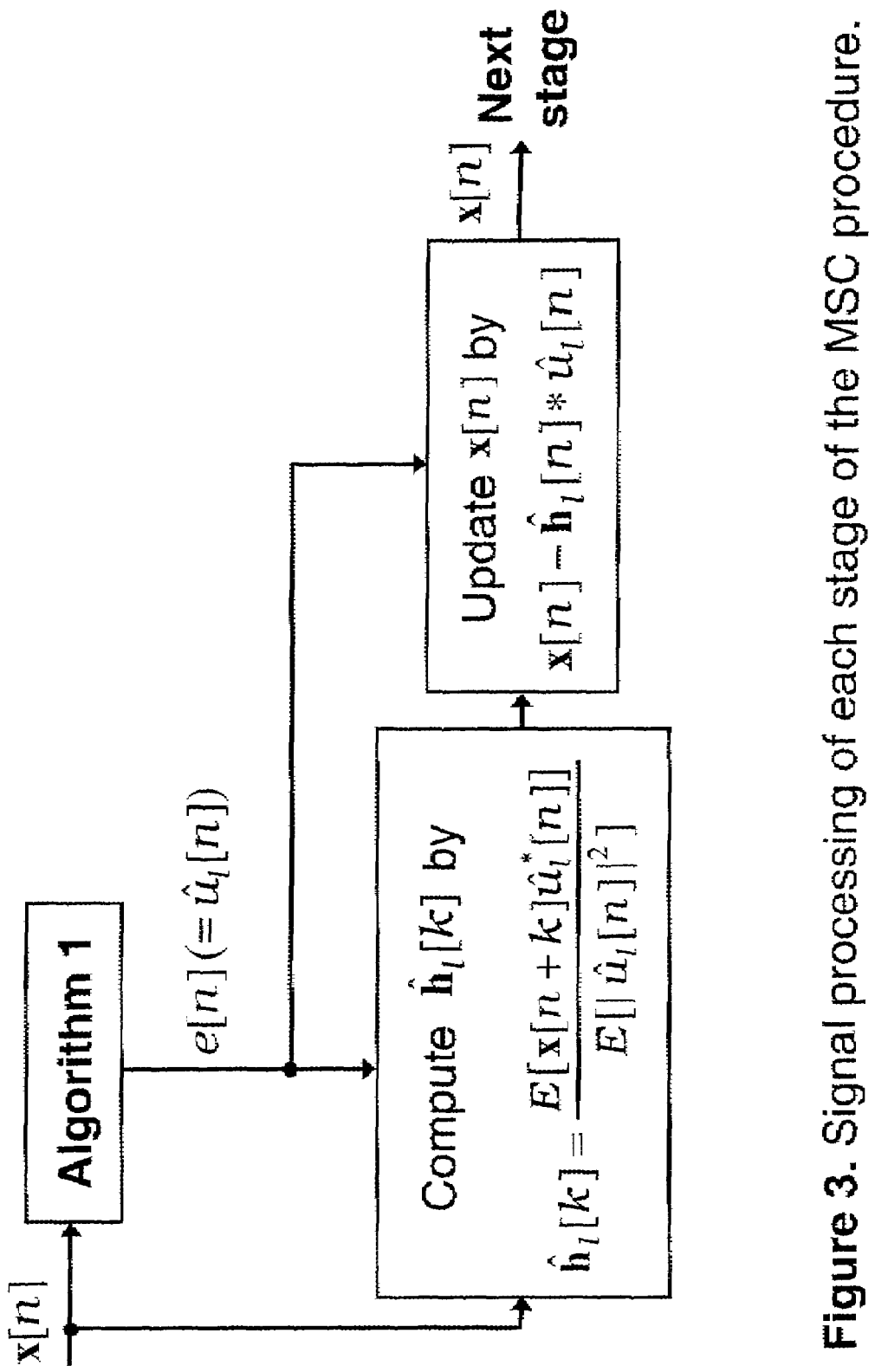
Figure 3. Signal processing of each stage of the MSC procedure.

BLIND ADAPTIVE FILTERING METHOD FOR RECEIVERS OF COMMUNICATION SYSTEMS

FIELD OF THE INVENTION

The present invention relates to a method of blind adaptive filtering for receivers of communication systems.

BACKGROUND OF INVENTION

The present invention relates to communications equipment, and more particularly to a blind adaptive filtering algorithm for receivers of communication systems without need of training sequences.

In wireless multi-user communication systems, antenna array based non-blind linear minimum mean square error (LMMSE) receivers utilize long training sequences for the suppression of multiple access interference (MAI) due to multiple users sharing the same channel and the suppression of intersymbol interference (ISI) due to channel distortion in wired communications and multi-path propagation in wireless communications. The MAI suppression and ISI suppression are crucial to the performance improvement of wireless communication systems. However the use of training sequences not only costs system resources but also involves synchronization issues and other cumbersome procedures. Therefore, receivers for blind mode (without need of training sequences) with good performance (of suppression of both MAI and ISI), and low complexity are of extreme importance in communication systems.

In digital communication systems, by sampling or matched filtering, the received continuous-time signal can be transformed to a discrete-time signal which can be approximated as the output signal of a discrete-time multi-input multi-output (MIMO) linear time-invariant (LTI) system on which a variety of detection and estimation algorithms are based. The proposed blind adaptive filtering algorithm for receivers of communication systems is also based on the discrete-time MIMO LTI system model.

Blind equalization (deconvolution) of an MIMO LTI system, denoted $H[n]$ ($P \times K$ matrix) is a problem of estimating the vector input $u[n]=(u_1[n], u_2[n], \ldots, u_K[n])^T$ (K inputs), where the superscript 'T' denotes the transposition, with only a set of non-Gaussian vector output measurements $x[n]=(x_1[n], x_2[n], x_P[n])^T$ (P outputs) as follows and as shown in FIG. 1:

$$x[n] = H[n] * u[n] + w[n] \quad (1)$$

$$= \sum_{k=-\infty}^{\infty} H[k] u[n-k] + w[n]$$

$$= \sum_{j=1}^{K} h_j[n] * u_j[n] + w[n]$$

where '*' denotes the discrete-time convolution operator, $h_j[n]$ is the jth column of $H[n]$, and $w[n]=(w_1[n],w_2[n], \ldots, w_P[n])^T$ (P×1 vector) is additive noise. For ease of later use, let us define the following notations cum$\{y_1,y_2, \ldots ,y_P\}$ pth-order cumulant of random variables $y_1,y_2, \ldots ,y_P$ cum$\{y{:}p, \ldots \}=$cum$\{y_1{=}y, y_2{=}y, \ldots, y_P{=}y, \ldots \}$ $C_{p,q}\{y\}=$cum$\{y{:}p, y^*{:}q\}$ ($y^*$ is complex conjugate of y)

$v_j=(v_j[L_1], v_j[L_1+1], \ldots, v_j[L_2])^T$ (($L=L_2-L_1+1)\times 1$ vector)

$v=(v_1^T, v_2^T, \ldots, v_P^T)^T$ $\tilde{x}_j[n]=(x_j[n-L_1], x_j[n-L_1-1], \ldots, x_j[n-L_2])^T$ $\tilde{x}[n]=(x_1^T[n], x_2^T[n], \ldots, x_P^T[n])^T$ $\tilde{R}=E[\tilde{x}^*[n]\tilde{x}^T[n]]$ (expected value of $\tilde{x}^*[n]\tilde{x}^T[n]$)

Assume that we are given a set of measurements $x[n]$, $n=0, 1, \ldots, N-1$ modeled by (1) with the following assumptions:

(A1) $u_j[n]$ is zero-mean, independent identically distributed (i.i d.) non-Gaussian with variance $E[?u_j[n]?^2]=\sigma_u^2$ and (p+q)th-order cumulant $C_{p,q}\{u_j[n]\} \neq 0$, and statistically independent of $u_k[n]$ for all $k \neq j$, where p and q are nonnegative integers and p+q^3.

(A2) The MIMO system $H[n]$ is exponentially stable.

(A3) The noise $w[n]$ is zero-mean Gaussian and statistically independent of $u[n]$.

Let $v[n]=(v_1[n], v_2[n], \ldots, v_P[n])^T$ denote a P×1 linear finite impulse response (FIR) equalizer of length $L=L_2-L_1+1$ for which $v[n] \neq 0$ (P×1 zero vector) for $n=L_1, L_1+1, \ldots, L_2$. Then the output of $e[n]$ of the FIR equalizer $v[n]$ can be expressed as $$e[n] = \sum_{j=1}^{P} v_j[n] * x_j[n] \quad (2)$$

$$= \sum_{j=1}^{P} v_j^T x_j[n]$$

$$= v^T \tilde{x}[n]$$

Tugnait (see "Identification and deconvolution of multichannel linear nonGaussian processes using higher-order statistics and inverse filter criteria," *IEEE Trans. Signal Processing*, vol. 45, no. 3, pp. 658–672, March 1997) proposed inverse filter criteria (IFC) for blind deconvolution of MIMO systems using second- and third-order cumulants or second- and fourth-order cumulants of inverse filter (i.e., equalizer) output Chi and Chen (see "MIMO inverse filter criteria and blind maximum ratio combining using HOS for equalization of DS/CDMA systems in multi-path," *Proc. Third IEEE Workshop on Signal Processing Advances in Wireless Communications*, Taoyuan, Taiwan, Mar. 20–23, 2001, pp. 114–117, see also "Cumulant-based inverse filter criteria for MIMO blind deconvolution: properties, algorithms, and application to DS/CDMA systems in multi-path," *IEEE Trans. Signal Processing*, vol. 49, no. 7, pp. 1282–1299, July 2001, and "Blind beamforming and maximum ratio combining by kutosis maximization for source separation in multi-path," *Proc. Thrid IEEE Workshop on Signal Processing Advances in Wireless Communications*, Taoyuan, Taiwan, March 20–23, 2001, pp. 243–246) find the optimum v by maximizing the following IFC $$J_{p,q}(v) = \frac{|C_{p,q}\{e[n]\}|}{|C_{1,1}\{e[n]\}|^{(p+q)/2}} \quad (3)$$

where p and q are nonnegative integers and p+q^3, through using gradient type iterative optimization algorithms because all $J_{p,q}(v)$ are highly nonlinear functions of v (without closed-form solutions for the optimum v). Note that the IFC given by (3) include Tugnait's IFC for (p,q)=(2,1) and (p,q)=(2,2) as special cases. Under the following conditions:
 (a1) signal-to-noise ratio (SNR) is infinity,
 (a2) the length of equalizer is infinite,
the optimum equalizer output turns out to be one of the K input signals except for an unknown scale factor and an unknown time delay (i.e., the optimum equalizer is a perfect equalizer for one of the K input signals).

Yeung and Yau (see "A cumulant-based super-exponential algorithm for blind deconvolution of multi-input multi-output systems" *Signal Processing,* vol. 67, no. 2, pp 141–162, 1998) and Inouye and Tanebe (see "Super-exponential algorithms for mulichannel blind deconvolution," *IEEE Trans. Signal Processing,* vol. 48, no.3, pp. 881–888, March 2000) also proposed an iterative super-exponential algorithm (SEA) for blind deconvolution of MIMO systems. The iterative SEA updates v at the Ith iteration by $$v_I = \frac{\sigma_u \cdot \tilde{R}^{-1} \tilde{d}_{I-1}}{\sqrt{\tilde{d}_{I-1}^H \tilde{R}^{-1} \tilde{d}_{I-1}}} \quad (4)$$

where \a\ denotes the Euclidean norm of vector a and $$\tilde{d}_{I-1} = \text{cum}\{e_{I-1}[n]:r, (e_{I-1}[n])^*:s-1, \tilde{x}^*[n]\} \quad (5)$$

in which r and s−1 are nonnegative integers, r+s^3 and $e_{I-1}[n]$ is the equalizer output obtained at the (I−1)th iteration. Again, under the conditions (a1) and (a2), the designed equalizer by the SEA is also a perfect equalizer (for one of the K input signals) with a super-exponential convergence rate. A remark regarding the distinctions of gradient type IFC algorithms and the SEA are as follows:
(R1) Although the computationally efficient SEA converges fast (with a super-exponential convergence rate) for SNR=∞ and sufficiently large N, it may diverge for finite N and finite SNR. Moreover, with larger computational load than updating the equalizer coefficients v by (4) at each iteration, gradient type iterative IFC algorithms (such as Fletcher-Powell algorithm (see D. M. Burley, *Studies in Optimization,* Falsted Press, New York, 1974)) always converge slower than the iterative SEA for p+q=r+s as x[n] is real and for (p,q)=(r,s) as x[n] is complex.

Therefore a need exists for a fast IFC based algorithm with performance similar to that of SEA with guaranteed convergence for finite SNR and finite data length, and is therefore suitable for a variety of practical uses.

SUMMARY OF THE INVENTION

A method according to the present invention is proposed for fast iterative MIMO blind deconvolution in a communications receiver using cumulant based inverse filter criteria with super-exponential convergence rate and low computational load. At each iteration the method updates the equalizer coefficients v using the same update equation as used by the super-exponential algorithm. If the value of the associated inverse filter criteria (IFC) is larger than that obtained at the immediately previous iteration, then the method goes to the next iteration. Otherwise the equalizer coefficients v are updated using gradient type optimization algorithms such that the value of IFC increases. As the algorithm converges, the optimum equalizer v[n] is obtained and its output e[n] is an estimate of one of the K driving inputs of the MIMO system. The convergence can be guaranteed and the number of iterations for convergence is usually between two and ten.

These and other features, which characterize the invention, are set forth in the claims annexed hereto and forming a further part hereof However, for a better understanding of the invention, and of the advantages and objectives attained through its use, reference should be made to the drawings, and to the accompanying descriptive matter, in which there is described exemplary embodiments of the invention

BRIEF DESCRIPTION OF DRAWINGS

FIG. 1 shows the multiple-input multiple-output (MIMO) system

FIG. 2 shows the method of signal processing at each iteration of Algorithm 1

FIG. 3 shows the method of signal processing of each stage of the MSC procedure

DETAILED DESCRIPTION

In the following detailed description of the preferred embodiments, reference is made to the accompanying drawings which form a part hereof, and in which is shown by way of illustration specific preferred embodiments in which the invention may be practiced. The preferred embodiments are described in sufficient detail to enable these skilled in the art to practice the invention, and it is to be understood that other embodiments may be utilized and that logical, changes may be made without departing from the spirit and scope of the present invention. The following detailed description is, therefore, not to be taken in a limiting sense, and the scope of the present invention is defined only be the appended claims.

A key property of the optimum equalizer v[n] using IFC, that can be proven true for any signal to noise ratio (SNR), is that the optimum v[n] with finite L using IFC and the one obtained by the SEA are the same (up to a scale factor) for p+q=r+s^3 as x[n] is real and for p=q=r=s^2 as x[n] is complex. Based on this property and (R1), the fast iterative MIMO blind deconvolution algorithm using IFC, called Algorithm 1, which processes the given x[n], n=0, 1, . . . , N−1, to estimate one of the K driving inputs $u_1[n]$, $u_2[n]$, . . . , $u_K[n]$ comprises two steps as follows:

In the first step given $v_{I-1}$ and $e_{I-1}[n]$ obtained at the (I−1)th iteration, $v_I$ at the Ith iteration is obtained by the following two steps and as shown in FIG. 2:

$v_I$ is obtained by using the following SEA equation $$v_I = \frac{\alpha \cdot \tilde{R}^{-1} \tilde{d}_{I-1}}{\sqrt{\tilde{d}_{I-1}^H \tilde{R}^{-1} \tilde{d}_{I-1}}} \quad (6)$$

with r+s=p+q as x[n] is real and with r=s=p=q as x[n] is complex and obtain the associated $e_I[n]$, n=0, 1, . . . , N−1, where α>0 is a parameter such that $E[?e_I[n]?^2]=\alpha^2$.

In the second step, if $J_{p,q}(v_I) > J_{p,q}(v_{I-1})$, go to the next iteration, otherwise update $v_I$ through a gradient type optimization algorithm such that $J_{p,q}(v_I) > J_{p,q}(v_{I-1})$ and obtain the associated $e_I[n]$, n=0, 1, . . . , N−1.

As x[n] is complex for p=q=r=s and x[n] is real for p+q=r+s, it can be shown that $$\left(\frac{\partial J_{p,q}(v)}{\partial v}\right)\bigg|_{v=v_{l-1}} = \frac{p+q}{2} \cdot J_{p,q}(v_{l-1}) \cdot \left\{\frac{1}{C_{p,q}\{e_{l-1}[n]\}} \cdot (\tilde{d}_{l-1})^* - \frac{1}{C_{1,1}\{e_{l-1}[n]\}} \cdot (\tilde{R}v_{l-1})^*\right\} \quad (7)$$

where $\tilde{d}_{l-1}$ has been obtained in step one (see (5)) and $\tilde{R}$ is the same at each iteration, indicating simple and straightforward computation for obtaining the gradient $\partial J_{p,q}(v)/\partial v$ in step two.

The method of Algorithm 1 is an iterative batch processing IFC algorithm with convergence speed, computational load similar to those of SEA due to step one of Algorithm 1. Moreover, its convergence can be guaranteed because $J_{p,q}(v_l)$ (which is bounded) increases at each iteration due to step two of Algorithm 1. An initial condition $v_0$ (e.g., the one associated with $v_i[n]=\delta[i-j]\delta[n-l]$, $i=1, 2, \ldots, P$ where $1 \leq j \leq P$, $L_1 \leq l \leq L_2$ and $\delta[n]=0$ for $n \neq 0$ and $\delta[0]=1$) is needed to initialize Algorithm 1 and the resultant equalizer output e[n] (after convergence) is the obtained estimate of one of the K driving inputs $u_1[n], u_2[n], \ldots, u_K[n]$ of the MIMO LTI system. The parameter $\alpha$ in equation (6) plays the role of restricting the dynamic range of the equalizer output to avoid overflow problem in DSP implementation.

Algorithm 1 can be applied wherever the unknown P×K system H[n] approximates an LTI system or a slowly linear time-varying system, and that Algorithm 1 can be applied as H[n] approximates either a single-input multi-output (SIMO) LTI system (i.e., P>1, K=1) or a single-input single-output (SISO) LTI system (i.e., P=K=1). Hence all the estimates $\hat{u}_1[n], \hat{u}_2[2], \ldots, \hat{u}_K[n]$ can be obtained by Algorithm 1 (possibly in a non-sequential order) through the multistage successive cancellation (MSC) procedure that includes the following two steps at each stage as shown in FIG. 3. First, find an input estimate, said $\hat{u}_l[n]$ (where l is unknown), using Algorithm 1, and then obtain the associated channel estimate by $$\hat{h}_l[k] = \frac{E[x[n+k]\hat{u}_l^*[n]]}{E[|\hat{u}_l[n]|^2]} \quad (8)$$

In the second step update x[n] by $x[n]-\hat{h}_l[n]*\hat{u}_l[n]$, i.e., cancel the contribution of $\hat{u}_l[n]$ in x[n]

In conjunction with the MSC procedure, Algorithm 1 can be applied wherever the given non-Gaussian measurements x[n] can be approximated as the outputs of an MIMO system (channel) given by (1) without the need of channel information and training sequences. The following are some possible applications of the above algorithm although the invention is by no means limited to these applications.

A smart antenna processing means is used in wireless communications when a communications receiver has an antenna array. The smart antenna processing means provides an estimate of a signal received from a particular user. For the scenario of K user signals arriving at an antenna array of P elements, the received P×1 signal vector x(t) can be modeled as $$x(t) = \sum_{k=1}^{K} \sum_{m=1}^{M_k} \alpha_{km} a(\theta_{km}) s_k(t - \tau_{km}) + w(t) \quad (9)$$

where $\theta_{km}$, $\alpha_{km}$ and $\tau_{km}$ are the angle-of-arrival (AOA), propagation loss and propagation delay associated with the mth path of user k, respectively; $M_k$ denotes the total number of paths of user k; $a(\theta_{km})$ denotes the array steering vector associated with $\theta_{km}$; w(t) is the noise vector; and $$s_k(t) = \sum_{n=-\infty}^{\infty} u_k[n] p_k(t - nT) \quad (10)$$

is the baseband signal of user k, where $u_k[n]$, $p_k(t)$, and T are the symbol sequence (non-Gaussian such as binary sequence of +1 and −1), signature waveform and symbol duration, respectively. In time division multiple access (TDMA) systems, usually $p_k(t)=p(t)$ (pulse shaping function) for all k. In direct sequence code division multiple access (DS/CDMA) communications systems, the signature waveform can be chosen as $$p_k(t) = \frac{1}{\sqrt{T}} \sum_{n=0}^{P-1} c_k[n] \phi(t - nT_c) \quad (11)$$

where P is the spreading gain, $T_c=T/P$ is chip period, $c_k[n]$ is a binary pseudo random sequence of $\{+1, -1\}$, and $\phi(t)$ is the rectangular chip pulse of magnitude equal to unity within the interval $t \in (0, T_c)$.

The received signal vector x(t) given by equation (9) can also be expressed as $$x(t) = \sum_{k=1}^{K} \sum_{n=-\infty}^{\infty} u_k[n] h_k(t - nT) + w(t) \text{ where} \quad (12)$$

$$h(t) = \sum_{m=1}^{M_k} \alpha_{km} a(\theta_{km}) p_k(t - \tau_{km}) \quad (13)$$

can be called the symbol-level space-time channel impulse response for user k. In most wireless communication environments, the channels $h_k(t)$, $k=1, \ldots, K$ can be assumed to be linear and time-invariant during the period of interest In the case of TDMA, the estimation of $u_1[n], u_2[n], \ldots, u_K[n]$ is based on the symbol waveform. Denote $\Delta_T = T/Q_T$ as the sampling period, where $Q_T \geq 1$ is the factor of oversampling. Sampling x(t) at $t=nT-i\Delta_T$, $n \in (-\infty, +\infty)$, equation (12) becomes $$x_T(nT - i\Delta_T) = \sum_{k=1}^{K} \sum_{d=-\infty}^{\infty} u_k[n-d] h_k(dT - i\Delta_T) + w_T(nT - i\Delta_T), \quad (14)$$

$$i = 0, 1, \ldots, Q_T - 1$$

and an MIMO system model as given by equation (1) can be easily obtained as $$x[n] = \sum_{k=1}^{K} \sum_{d=-\infty}^{\infty} u_k[n-d]\underline{h}_k[d] + w[n] \quad (15)$$

$$= \sum_{d=-\infty}^{\infty} H[d]u[n-d] + w[n] \text{ where} \quad (16)$$

$$x[n] = \begin{bmatrix} x_T(nT) \\ x_T(nT - \Delta_T) \\ \vdots \\ x_T(nT - (Q_T-1)\Delta_T) \end{bmatrix}_{(PQ_T) \times 1}, \quad (17)$$

$$\underline{h}_k[d] = \begin{bmatrix} h_k(dT) \\ h_k(dT - \Delta_T) \\ \vdots \\ h_k(dT - (Q_T-1)\Delta_T) \end{bmatrix}_{(PQ_T) \times 1}, \quad (18)$$

$$w[n] = \begin{bmatrix} w_T(nT) \\ w_T(nT - \Delta_T) \\ \vdots \\ w_T(nT - (Q_T-1)\Delta_T) \end{bmatrix}_{(PQ_T) \times 1}, \quad (19)$$

and $$H[d] = [\underline{h}_1[d], \underline{h}_2[d], \ldots, \underline{h}_K[d]] \quad (20)$$

is a $(PQ_T) \times K$ system. Therefore, all the user's symbol sequences $u[n]=(u_1[n], u_2[n], \ldots, u_K[n])^T$ can be detected using Algorithm 1 through the MSC procedure followed by threshold decision. Therefore Algorithm 1 performs as a blind space-time multi-user detector as $P^{\wedge}2$, whereas as $P=I$, Algorithm 1 performs as a blind multi-user detection algorithm (without space diversity).

In the CDMA case, the estimation of $u_1[n], u_2[n], \ldots, u_K[n]$ is based on the signature wave form and related matched filtering outputs. Denote $\Delta_C = T_c/Q_C$ as the sampling period, where $Q_C^{\wedge}1$ is the factor of over-sampling. Sampling $x(t)$ at $t=lT_c-i\Delta_C$, $i=0,1,\ldots,Q_C-1$, equation (12) becomes $$x_C(lT_c - i\Delta_C) = \sum_{k=1}^{K} \sum_{n=-\infty}^{\infty} u_k[n]h_k(lT_c - i\Delta_C - nT) + w_C(lT_c - i\Delta_C) \quad (21)$$

By taking $x_C(lT_c - i\Delta_C)$, $i=0, 1, \ldots, Q_C-1$, one can obtain the $(PQ_C) \times 1$ signal vector $$\underline{x}_C(lT_c) = \sum_{k=1}^{K} \sum_{n=-\infty}^{\infty} u_k[n]\underline{h}_k(lT_c - nT) + \underline{w}_c(lT_c) \quad (22)$$

where $$\underline{x}_C(lT_c) = [x_C^T(lT_c), x_C^T(lT_c - \Delta_C), \ldots, x_C^T(lT_c - (Q_C-1)\Delta_C)]^T \quad (23)$$

$$\underline{h}_C(lT_c) = [h_k^T(lT_c), h_k^T(lT_c - \Delta_C), \ldots, h_K^T(lT_c - (Q_C-1)\Delta_C)]^T \quad (24)$$

$$\underline{w}_C(lT_c) = [w_C^T(lT_c), w_C^T(lT_c - \Delta_C), \ldots, w_C^T(lT_c - (Q_C-1)\Delta_C)]^T \quad (25)$$

Assume that the signature waveform is chosen as equation (11). Then the discrete signature waveform of the kth user is given by $$\rho_k(lT_c) = \frac{1}{\sqrt{T}} \sum_{n=0}^{P-1} c_k[n]\phi(lT_c - nT_c) = \frac{1}{\sqrt{T}} c_k[l] \quad (26)$$

(since $\phi(t)$ is the rectangular pulse)

where $0 \leq l \leq P-1$, and the output signal vector after despreading with the signature waveform of user $k_0$ can be expressed as $$\underline{x}_C^{k_0}(lT_c) = \sum_{i=0}^{P-1} \underline{x}_C(lT_c - iT_c)\rho_{k_0}(PT_c - iT_c) \quad (27)$$

$$= \sum_{k=1}^{K} \sum_{n=-\infty}^{\infty} u_k[n]\underline{q}_k^{k_0}(lT_c - nT) + \underline{w}_C^{k_0}(lT_c) \text{ where} \quad (28)$$

$$\underline{q}_k^{k_0}(lT_c) = \frac{1}{\sqrt{T}} \sum_{i=0}^{P-1} \underline{h}_k(lT_c - iT_c)\bar{c}_{k_0}[i] \quad (29)$$

$$\underline{w}_C^{k_0}(lT_c) = \sum_{i=0}^{P-1} \underline{w}_C(lT_c - iT_c)\bar{c}_{k_0}[i] \quad (30)$$

$$\bar{c}_k[l] = c_k[P-l], \quad 0 \leq l \leq P-1 \quad (31)$$

Let $lT_c = mT - i_jT_c$, $j=1,2,\ldots,J \leq P$, be the J time indexes associated with the J largest values of $$\sum_{m=0}^{N-1} \|\underline{x}_C^{k_0}(mT - iT_c)\|^2, i = 0, 1, \ldots, P-1.$$

Then a symbol-level MIMO signal model as given by (1) can be obtained as $$x^{k_0}[m] = \sum_{k=1}^{K} \sum_{n=-\infty}^{\infty} u_k[n]q_k^{k_0}(mT - nT) + w^{k_0}[m] \quad (32)$$

$$= \sum_{n=-\infty}^{\infty} Q[m-n]u[n] + w^{k_0}[m] \text{ where} \quad (33)$$

$$x^{k_0}[m] = \begin{bmatrix} \underline{x}_C^{k_0}(mT - i_1T_c) \\ \underline{x}_C^{k_0}(mT - i_2T_c) \\ \vdots \\ \underline{x}_C^{k_0}(mT - i_JT_c) \end{bmatrix}_{(JPQ_C) \times 1} \quad (34)$$

$$\underline{q}_k^{k_0}[mT] = \begin{bmatrix} q_k^{k_0}(mT - i_1T_c) \\ q_k^{k_0}(mT - i_2T_c) \\ \vdots \\ q_k^{k_0}(mT - i_JT_c) \end{bmatrix}_{(JPQ_C) \times 1} \quad (35)$$

$$w^{k_0}[m] = \begin{bmatrix} \underline{w}_C^{k_0}(mT - i_1 T_c) \\ \underline{w}_C^{k_0}(mT - i_2 T_c) \\ \vdots \\ \underline{w}_C^{k_0}(mT - i_J T_c) \end{bmatrix}_{(JPQ_C) \times 1} \quad (36)$$

and $$Q[m] = [\underline{q}_1^{k_0}(mT), \underline{q}_2^{k_0}(mT), \ldots, \underline{q}_K^{k_0}(mT)] \quad (37)$$

is a $(JPQ_C) \times K$ system. Therefore, all the user's symbol sequences $u[n] = (u_1[n], u_2[n], \ldots, u_K[n])^T$ can be detected using Algorithm 1 through the MSC procedure followed by a threshold decision.

Another application for the algorithm of the invention is for blind equalization in a communications system. The baseband received signal $x(t)$ in the presence of M paths in wireless communications (or channel distortion in wired communications) can be expressed as $$x(t) = \sum_{m=1}^{M} \alpha_m s(t - \tau_m) + \omega(t) \quad (38)$$

where $\alpha_m$ and $\tau_m$ are the amplitude and propagation delay associated with the mth path, respectively; $w(t)$ is the noise; and $$s(t) = \sum_{n=-\infty}^{\infty} u[n]p(t - nT) \quad (39)$$

is the user's signal where $u[n]$, $p(t)$ and T are the symbol sequence (non-Gaussian such as binary sequence of +1 and −1), signature waveform and symbol duration, respectively.

By sampling $x(t)$ at $t = nT - i(T/Q)$, $i = 0, 1, \ldots, Q-1$, where $Q \wedge 1$ is the integer factor of over-sampling and then stacking the Q over-sampling vector samples, one can obtain an MIMO model given by (1) where $H[n]$ is a $Q \times 1$ system, and therefore, the user's symbol sequence $u[n]$ can be obtained using Algorithm 1 followed by threshold decision. Therefore, Algorithm 1 performs as a blind equalizer for the suppression of either multi-path effects in wireless communications or channel distortion in wired communications.

A further application of the invention is in blind RAKE receivers In the signal processing procedure of RAKE receivers, assume that there are P transmission paths (fingers) associated with the desired user and the $P \times 1$ vector $x[n] = (x_1[n], x_2[n], \ldots, x_P[n])^T$ includes P estimates of the desired user's symbol sequence $s[n]$ associated with the P respective transmission paths. The $x[n]$ can be modeled as $$x[n] = a \cdot s[n] + w[n] \quad (40)$$

where a is a $P \times 1$ (unknown) column vector of P signal (complex) amplitudes of $s[n]$ associated with the P fingers, and the $P \times 1$ vector $w[n]$ is noise. We desire to estimate $s[n]$ from $x[n]$ with no need of any information about a.

Note that the $P \times 1$ system given by (40) is a special case of the MIMO model given by (1) with $H[n] \neq 0$ ($P \times 1$ zero vector) only for $n = 0$. Algorithm 1, with $L_1 = L_2 = 0$ (thus $L = 1$, and $v = v[0]$), can be employed to obtain an estimate $$\hat{s}[n] = v^T x[n] = (v^T a) s[n] + 84\ ^T w[n] \quad (41)$$

that can be shown to have the maximum of $$SNR = \frac{E[|(v^T a)s[n]|^2]}{E[|(v^T w)[n]|^2]} \quad (42)$$

attained by the non-blind LMMSE estimator of $s[n]$ that requires the vector a given in advance.

Various additional modifications may be made to the illustrated embodiments without departing from the spirit and scope of the invention. Therefore, the invention lies in the claims hereinafter appended.

What is claimed:

1. An iterative method for blind deconvolution using an equalizer in a communications receiver for estimating one of users' symbol sequences ($u_j[n]$, $j = 1, 2, \ldots, K$), the method at each iteration comprising the steps of:
updating the equalizer coefficients $v_I$ at the Ith iteration using the following equation:

$$v_I = \frac{\alpha \cdot \tilde{R}^{-1} \tilde{d}_{I-1}}{\sqrt{\tilde{d}_{I-1}^H \tilde{R}^{-1} \tilde{d}_{I-1}}};$$

determining the associated equalizer output $e_I[n]$; and
comparing inverse filter criteria $J_{p,q}(v_I)$ with $J_{p,q}(v_{I-1})$ and if $J_{p,q}(v_I) > J_{p,q}(v_{I-1})$, going to the next iteration, otherwise updating $v_I$ through a gradient type optimization algorithm so that $J_{p,q}(v_I) > J_{p,q}(v_{I-1})$ and then obtaining the associated $e_I[n]$;
wherein $\tilde{R}$ is a expected value $\tilde{d}$ is a cumulation, $\alpha$ is a scale factor, and p,q are nonnegative integers.

2. The method of claim 1, further comprising a step of using a threshold decision to detect a user's symbol sequence associated with the obtained symbol sequence estimate $\hat{u}_l[n] = e_l[n]$ (where l is unknown, and $e_l[n]$ is an equalizer output) in case of converge.

3. The method of claim 1, which further utilizes a multistage successive cancellation (MSC) procedure, at each stage comprising the steps of:
obtaining a symbol sequence estimate $\hat{u}_l[n] = e_l[n]$ (where l is unknown);
determining the associated channel estimate of the obtained symbol sequence $\hat{u}_l[n]$ by $$\hat{h}_l[k] = \frac{E[x[n+k]\hat{u}_l^*[n]]}{E[|\hat{u}_l[n]|^2]}$$

wherein $\hat{h}_l[k]$ is the channel estimate; and
updating $x[n]$ by $x[n] - \hat{h}_l[n] * \hat{u}_l[n]$, wherein $x[n]$ is non-Gaussian vector output measurements.

4. The method of claim 3, which further comprises a step of using a threshold decision to detect a user's symbol sequence associated with $\hat{u}_l[n]$ at each stage of the MSC procedure.

5. A method for iterative blind deconvolution using an equalizer in a communications receiver of a multi-input multi-output (MIMO) system, for estimating one of users' symbol sequences ($u_j[n]$, $j=1, 2, \ldots, K$), the method comprising the steps of:

updating equalizer coefficients;

determining if an Inverse Filter Criteria (IFC) value in a current iteration is larger than that obtained in a previous iteration and if so proceeding to the next iteration, otherwise updating the equalizer coefficients to increase the IFC value;

determining an equalizer, and an estimate of driving inputs to the MIMO system; and detecting an estimation of the user's symbol sequence by a detection threshold.

6. The method of claim 5, wherein the equalizer coefficients are obtained utilizing the following formula:

$$v_l = \frac{\alpha \cdot \tilde{R}^{-1} \tilde{d}_{l-1}}{\sqrt{\tilde{d}_{l-1}^H \tilde{R}^{-1} \tilde{d}_{l-1}}}$$

wherein $\tilde{R}$ is a expected value, $\tilde{d}$ is a cumulation, $\alpha$ is a scale factor, and $v_l$ is the equalizer coefficient.

7. The method of claim 5, wherein the threshold decision is used to detect the user's symbol sequence associated with the obtained symbol sequence estimate $\hat{u}_l[n]=e_l[n]$ (where l is unknown, and $e_l[n]$ is an equalizer output at the lth iteration) in case of converge.

8. The method of claim 5, which further utilizes a multistage successive cancellation (MSC) procedure, at each stage comprising the steps of:

obtaining a symbol sequence estimate $\hat{u}_l[n]=e_l[n]$ (where l is unknown), wherein $e_l[n]$ is an equalizer output at the lth iteration;

determining an associated channel estimate of the obtained symbol sequence by $$\hat{h}_l[k] = \frac{E[x[n+k]\hat{u}_l^*[n]]}{E[|\hat{u}_l[n]|^2]}$$

wherein $\hat{h}_l[k]$ is the channel estimate; and updating $x[n]$ by $x[n]-\hat{h}_l[n]*\hat{u}_l[n]$, wherein $x[n]$ is non-Gaussian vector output measurements.

9. The method of claim 8, wherein the threshold decision is used to detect the user's symbol sequence associated with $\hat{u}_l[n]$ at each stage of the MCS procedure.

* * * * *